United States Patent
Haag et al.

(10) Patent No.: US 11,954,410 B2
(45) Date of Patent: Apr. 9, 2024

(54) WATERSHED MARCHING-DELINEATION ALGORITHM

(71) Applicant: Drexel University, Philadelphia, PA (US)

(72) Inventors: Scott Haag, Chalfont, PA (US); Ali Shokoufandeh, New Hope, PA (US)

(73) Assignee: Drexel University, Philadelphia, PA (US)

( * ) Notice: Subject to any disclaimer, the term of this patent is extended or adjusted under 35 U.S.C. 154(b) by 108 days.

(21) Appl. No.: 16/450,612

(22) Filed: Jun. 24, 2019

(65) Prior Publication Data

US 2019/0392094 A1 Dec. 26, 2019

Related U.S. Application Data

(60) Provisional application No. 62/688,609, filed on Jun. 22, 2018.

(51) Int. Cl.
*G06F 30/20* (2020.01)
*G06T 17/00* (2006.01)
*G06F 111/10* (2020.01)

(52) U.S. Cl.
CPC .............. *G06F 30/20* (2020.01); *G06T 17/00* (2013.01); *G06F 2111/10* (2020.01)

(58) Field of Classification Search
CPC ....... G06F 30/20; G06F 2111/10; G06T 17/00
USPC ............................................................ 702/2
See application file for complete search history.

(56) References Cited

U.S. PATENT DOCUMENTS 6,937,760 B2 * 8/2005 Schoepflin ................ G06T 7/12
382/173

OTHER PUBLICATIONS

Hagg_2017 (A Watershed Delineation Algorithm for 2D Flow Direction Grids arXiv: 1708.00354v1 [cs.DS] Aug. 1, 2017) (Year: 2017).*
Hagg_2016 (Development of a data model to facilitate rapid Watershed Delineation arXiv:1611.09131v1 [cs.DS] Nov. 11, 2016) (Year: 2016).*

* cited by examiner

*Primary Examiner* — Brian S Cook
(74) *Attorney, Agent, or Firm* — Schott, P.C.

(57) ABSTRACT

The constrained watershed boundary (CWB), defined as a polygon containing all the flow direction grid cells with a surface flow distance less than a user prescribed threshold uses an algorithm that builds upon the HSM algorithm proposed and augments the data structure with a flow distance grid calculated directly from the original flow direction grid.

12 Claims, 12 Drawing Sheets

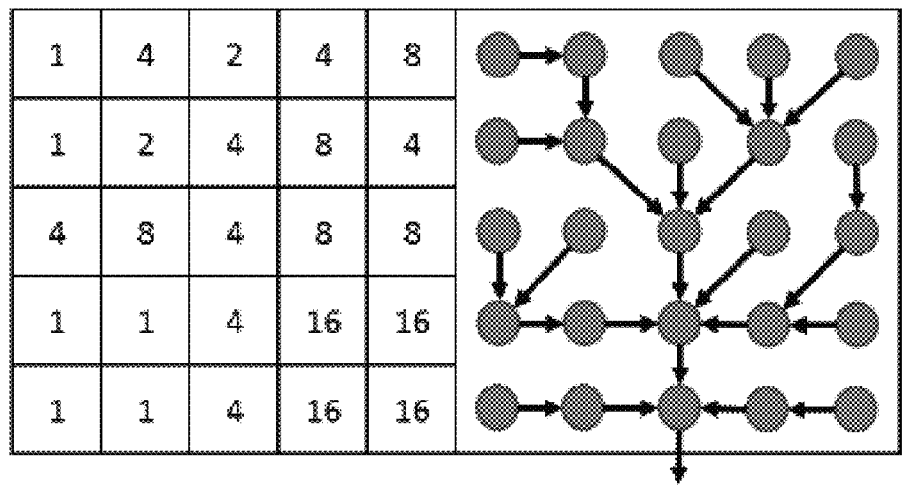
FIG.1.1
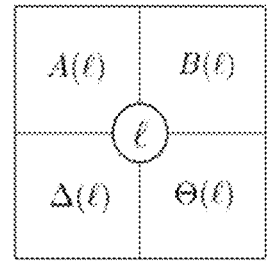
FIG.1.2
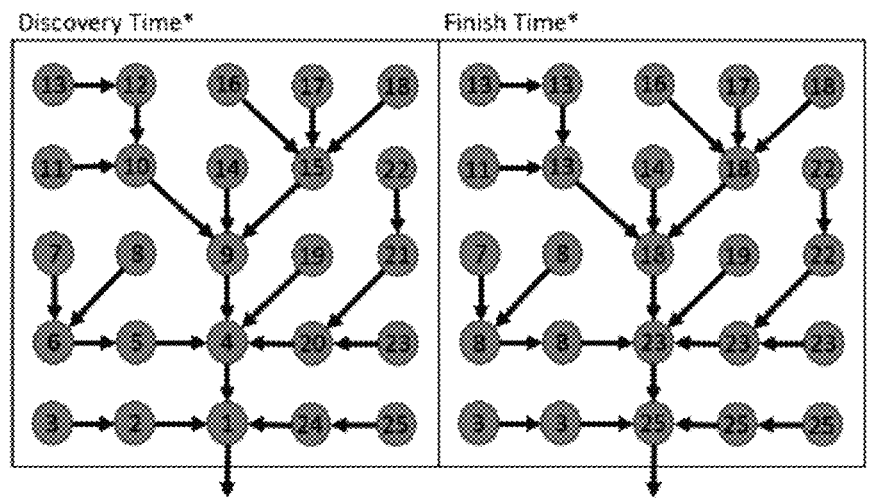
FIG.1.3

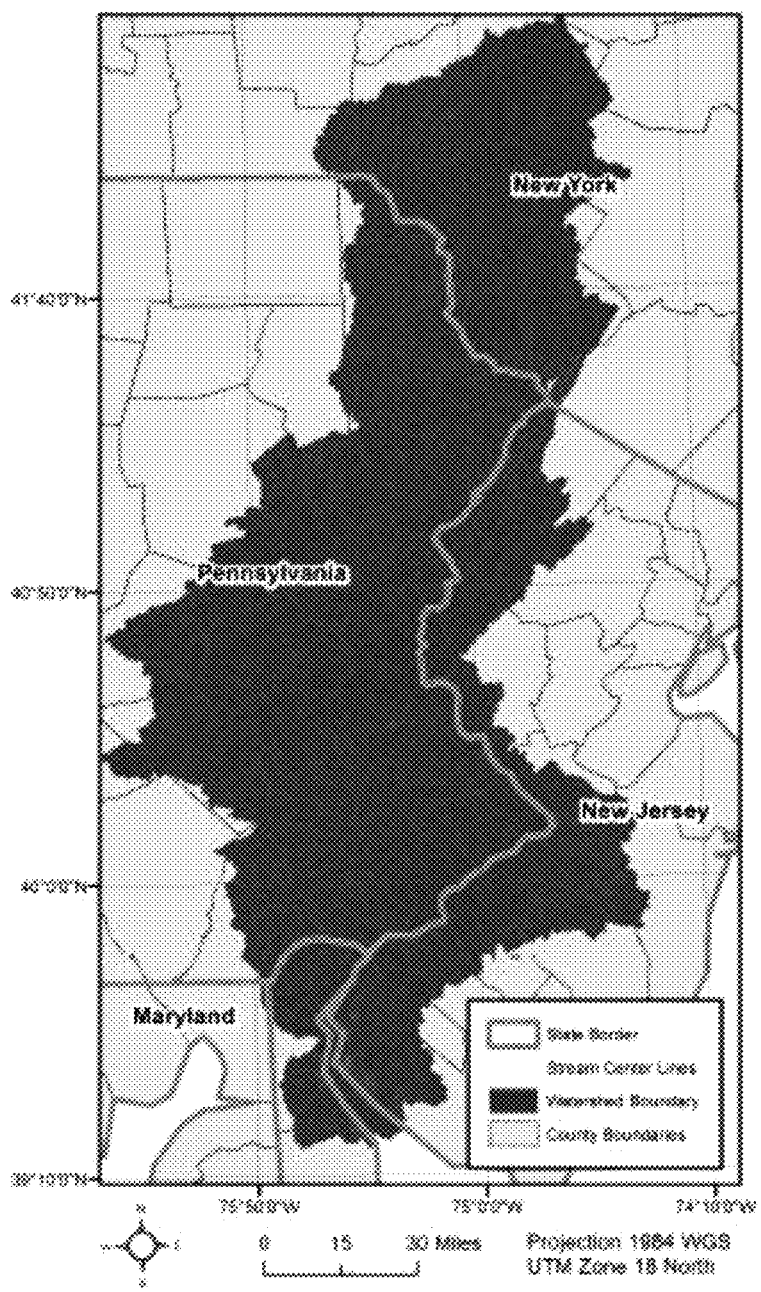
FIG.1.4

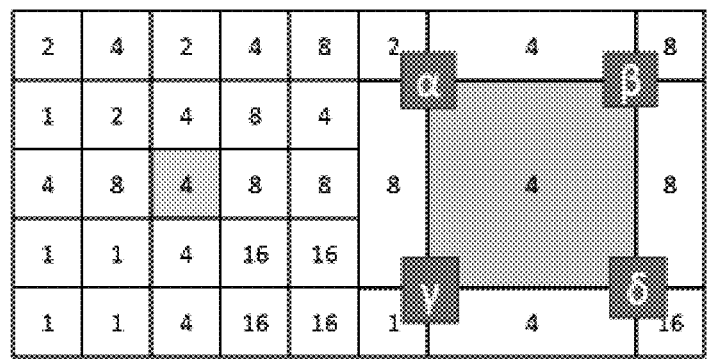
FIG.1.5
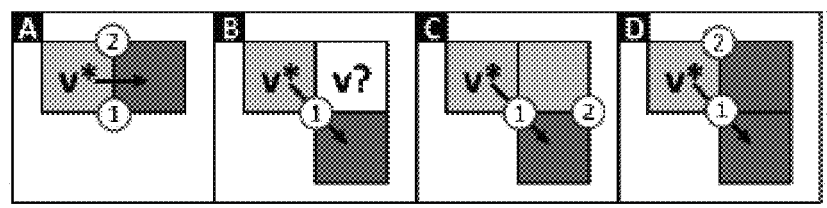
FIG.1.6
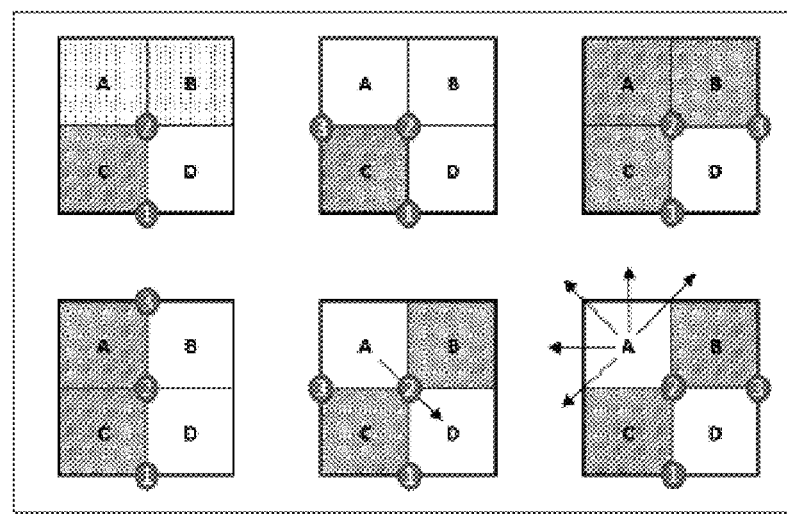
FIG.1.7

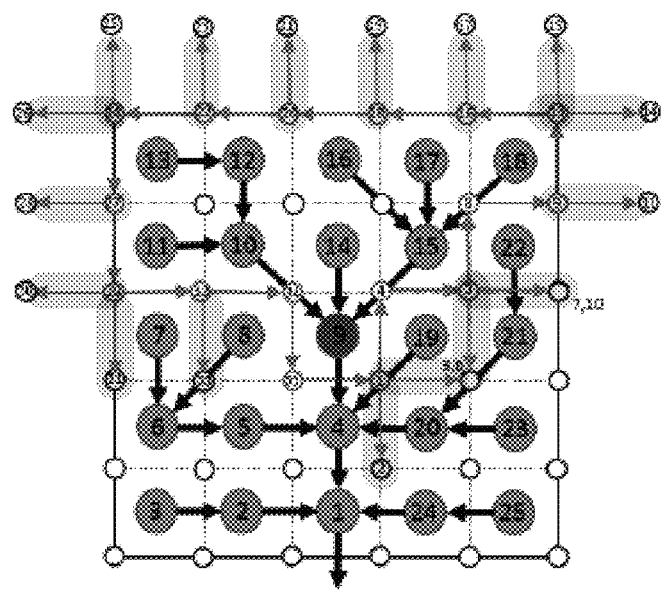
FIG.1.8

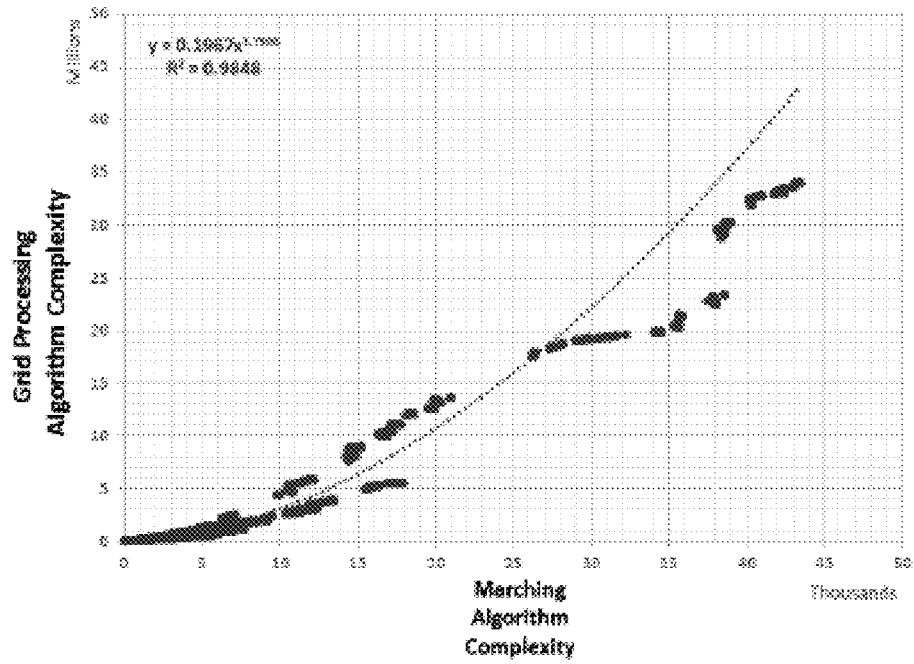
FIG.1.9
| Test ID | Polygon Size (km2) | Watershed Size (km2) | WMA Time (seconds) | ESRI Time (seconds) | WMA times faster (x) |
|---|---|---|---|---|---|
| 0 | 1.96E-03 | 4.70E-03 | 0.50 | 372 | 708 |
| 1 | 8.13E-01 | 7.78E+01 | 1.2 | 394 | 324 |
| 2 | 1.96E+01 | 1.87E+02 | 4.2 | 474 | 114 |
| 3 | 6.49E+00 | 3.98E+01 | 0.80 | 384 | 461 |
| 4 | 2.43E+02 | 7.81E+03 | 6.2 | 4387 | 703 |
| 5 | 5.64E+01 | 2.84E+03 | 5.5 | 1173 | 212 |
| 6 | 1.25E+03 | 4.44E+03 | 6.6 | 2161 | 327 |
| 7 | 1.39E-01 | 6.96E+04 | 15 | 17890 | 1175 |
| 8 | 1.10E+02 | 8.84E+02 | 5.7 | 746 | 131 |
| 9 | 2.21E+00 | 6.86E+02 | 2.3 | 693 | 308 |
| 10 | 1.07E+02 | 7.37E+02 | 6.2 | 737 | 119 |
| TOTAL | | | 54.5 | 29410 | 540 |
FIG.1.10

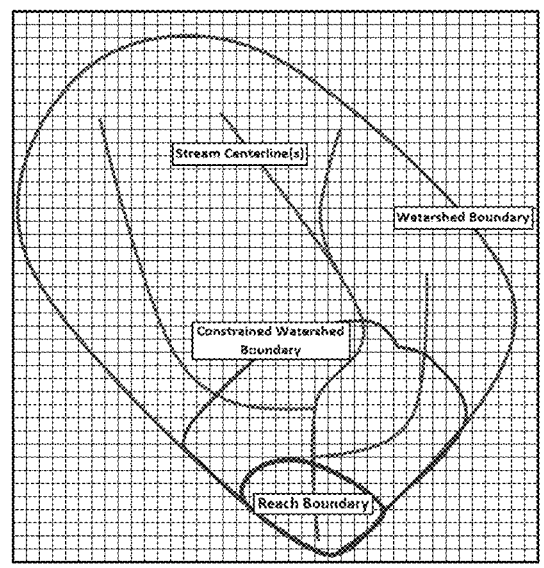
FIG. 2.1
FIG. 2.2

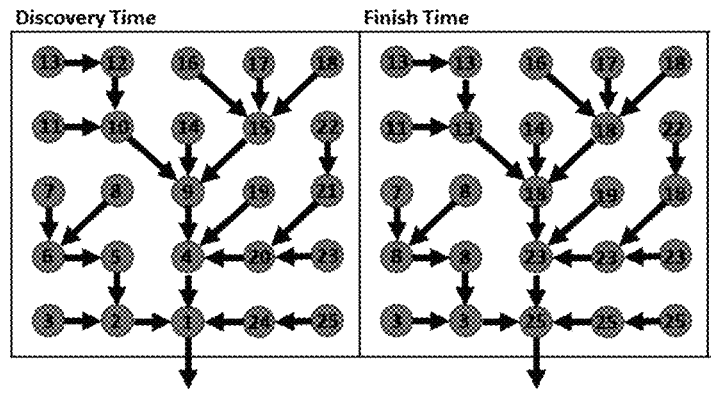
FIG. 2.3
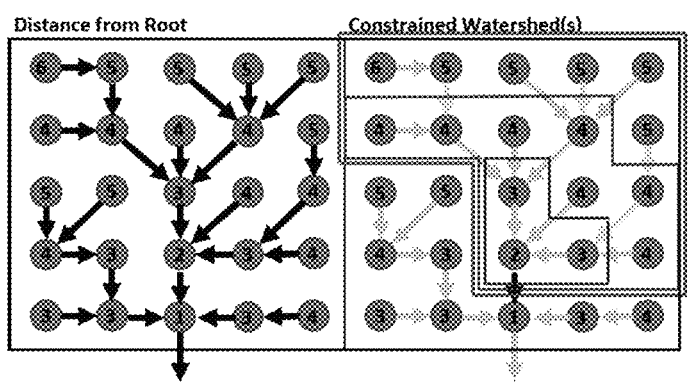
FIG. 2.4

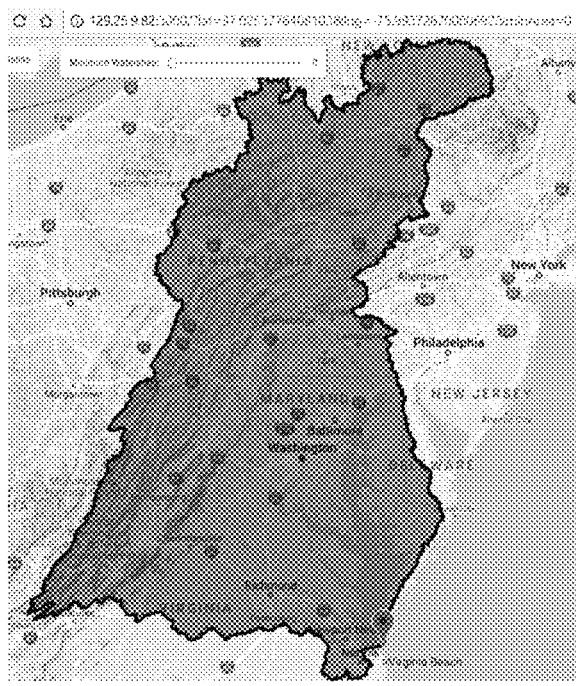
FIG. 2.5
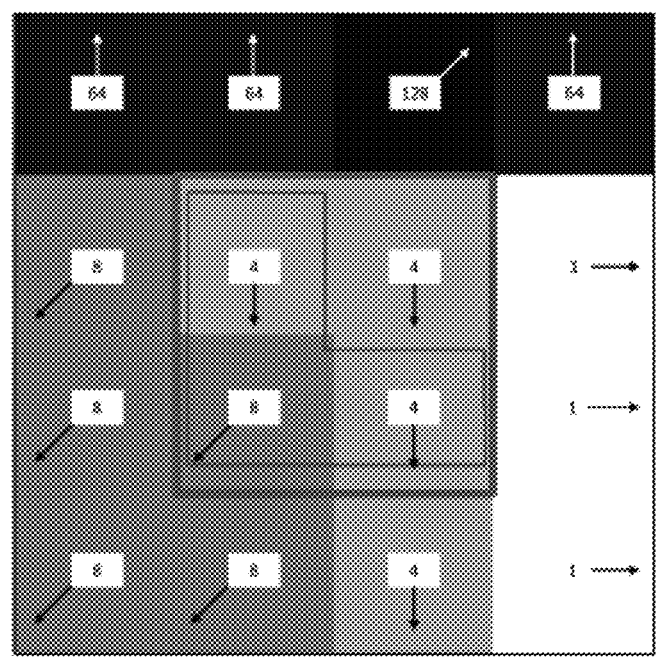
FIG. 3.1

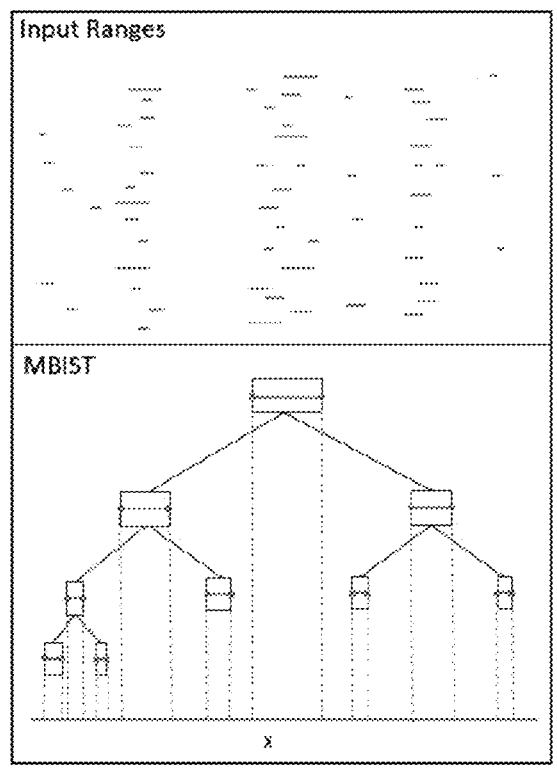
FIG. 4.1
FIG. 4.2

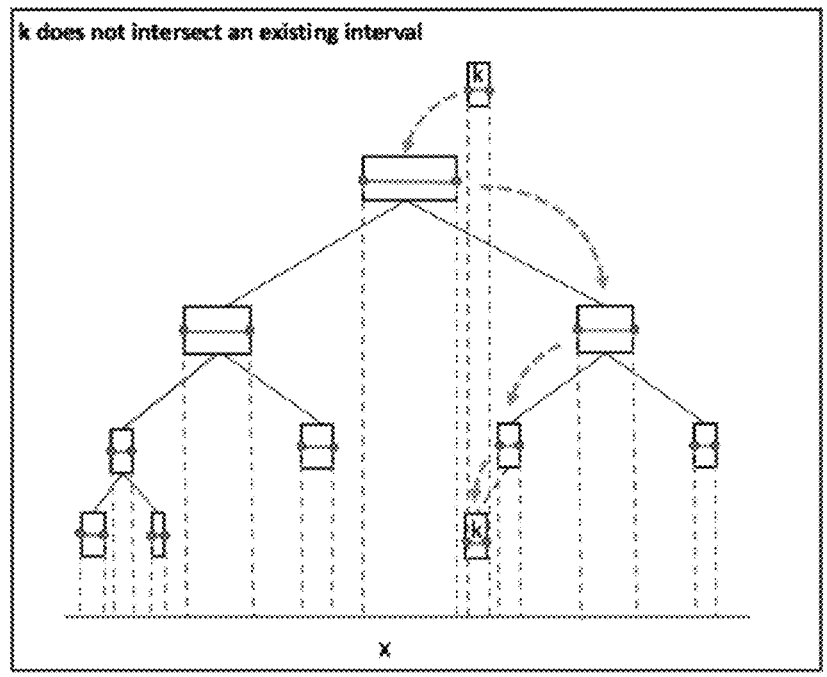
FIG. 4.3
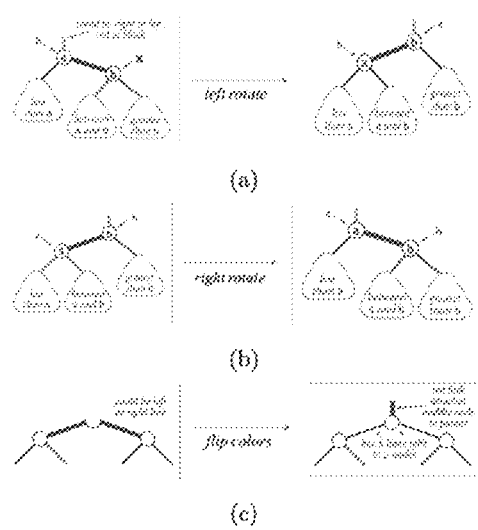
FIG. 4.4

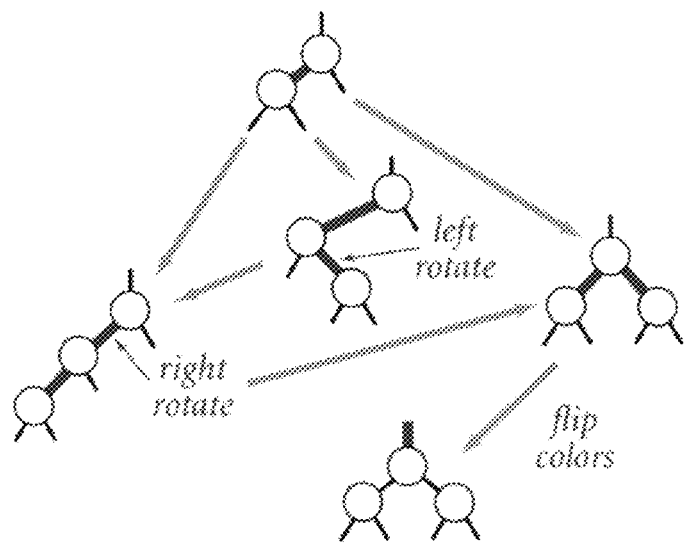
FIG. 4.5
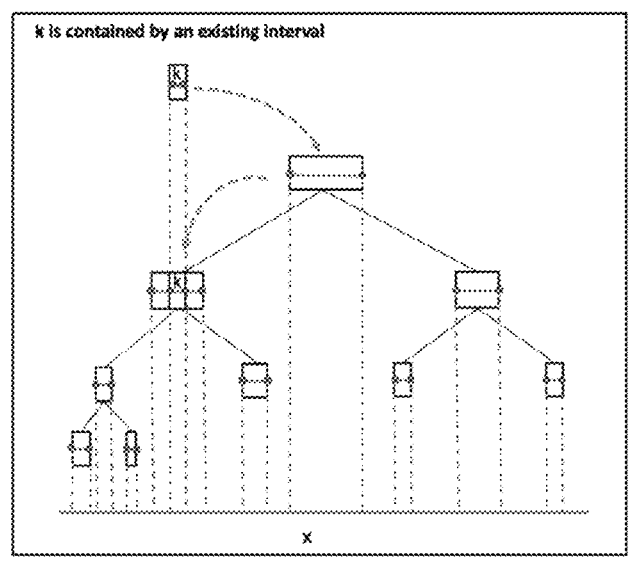
FIG. 4.6

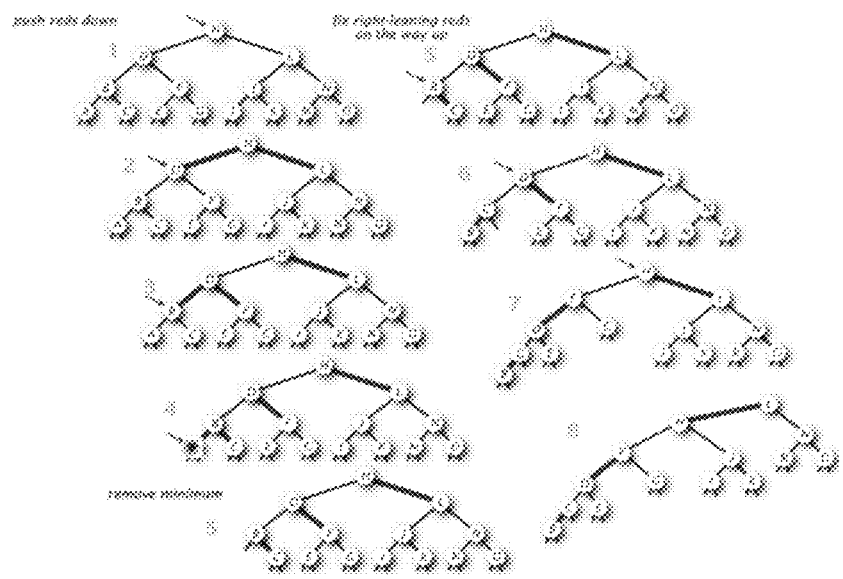
FIG. 4.7
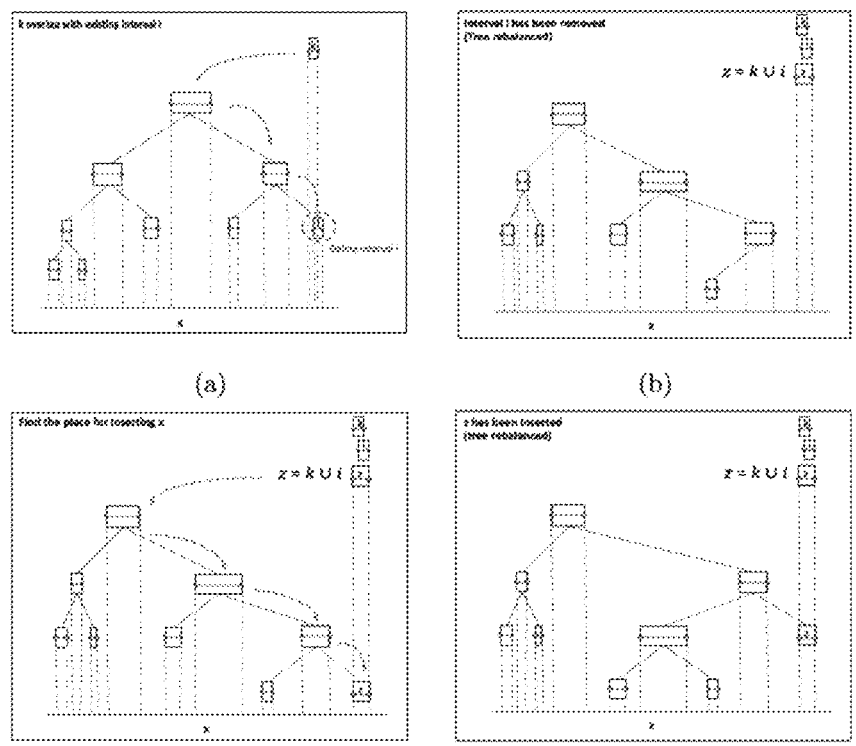
FIG. 4.8

WATERSHED MARCHING-DELINEATION ALGORITHM

STATEMENT REGARDING GOVERNMENT SUPPORT

This invention was made with government support under Contract No. CB-963630-01-0 awarded by the Environmental Protection Agency. The government has certain rights in the invention.

BACKGROUND

Marching algorithms may be used to address problems in physics, chemistry, fluid mechanics, combustion, image processing, and material science. Fundamentally marching algorithms separate surfaces into inside and outside components. In biomedical image processing, a three-dimensional marching algorithm also known as, "Marching Cubes" divides medical images into triangles and associated 3D objects to identify image segmentation in identifying regions of interest (e.g., organs or abnormalities). Efficient marching algorithms make identity decisions locally as Boolean conditions (on the boundary or not on the boundary) to make a forward march. Therefore, the application of marching algorithms to the watershed delineation problem may provide a solution to the global problem of watershed inclusion given any input pour point. For this reason, watershed delineation may be the "basic modelling element" for hydrological problems.

A number of software packages such as ESRI's hydrologic analysis tools have been designed to support the creation of watersheds as polygonal boundaries (e.g., a vector of coordinates that represent a polygon on a two-dimensional planar surface).

SUMMARY OF THE EMBODIMENTS

The constrained watershed boundary (CWB), defined as a polygon containing all the flow direction grid cells with a surface flow distance less than a user prescribed threshold uses an algorithm that builds upon the HSM algorithm.

The systems described herein may be used in hydrodynamic models, flooding, infrastructure, biological, and ecological modeling, nutrient and contaminate source tracking, and insurance, engineering, and military sectors

BRIEF DESCRIPTION OF THE EMBODIMENTS

FIG. 1.1 shows a flow direction grid and its associated graph G(V,E) representation.

FIG. 1.2 shows Labels for neighboring cells of a lattice location $l \in \mathcal{L}$ denoted as $\{\mathcal{A}(l), \mathcal{B}(l), \Omega(l), \Delta(l)\}$.

FIG. 1.3 shows a graph labelled with discovery and finish times using the Modified Nested Set (MNS) Algorithm.

FIG. 1.4 shows an overview map of the Delaware River watershed study area.

FIG. 1.5 shows a lattice imposed on flow direction grid.

FIG. 1.6 Initial flow direction can either cross a lattice edge (A) or a lattice location (B). For the case B, note that grid cell v? can either be in the watershed (C) or out (D). For case C the first edge on the boundary will go canonically East, for case D canonically North.

FIG. 1.7 shows an example of the potential five states of the lattice at any one step in the marching algorithm, (A) shows the preceding march state where grid cells A and B are indeterminate for inclusion in the watershed, (B) shows the march moving west when neither cells A nor B may be in the watershed, (C) shows a march to the east when both A and B are in the watershed, plate D. shows a march to the north when only A may be in the watershed, (E) shows a march to the west when only B may be in the watershed and the flow direction crosses between A and D, finally (F) shows march to the east when hen only B may be in the watershed and A does not cross from A to D.

FIG. 1.8 shows Marching Algorithm marching steps for $v\_$ with $d(v^*)=9$ ($f(v^*)=18$). Edges in red indicate successful march, while green edges show negative results for boundary condition. Graph vertices (blue circles) are labelled with the MNS algorithm discover time. HSM lattice locations (small black circles) are labelled with the recursive step in the HSM algorithm.

FIG. 1.9 shows an illustration of the complexity comparison between the proposed algorithm vs. existing techniques for n=14,718 watershed in the Delaware River Drainage.

FIG. 1.10 shows a table showing the results of the WMA vs existing technique (ESRI) showing our method may be approximately 500 times faster.

FIG. 2.1 shows an example of the reach scale, watershed scale, and the constrained watershed boundaries.

FIG. 2.2 shows an example D8 flow direction grid.

FIG. 2.3 shows an example modified nested set labeling of flow direction grid cell where the left panel shows unique discovery value and the right panel shows finish time.

FIG. 2.4 shows on the left, distance from root, and on the right, creation of three constrained watershed boundaries given Discovery Time of 2, and constrained distance value of (2 in purple, 3 in red, and 5 in green).

FIG. 2.5 shows an overview map showing the endpoint for the HSM algorithm for the Chesapeake Bay Watershed 30 m FDG. The background image is the Google Map API accessed in March of 2018.

FIG. 3.1 shows a simple test case for comparing two watershed boundary returns.

FIG. 4.1 shows an overview of MBIST created from a list of intervals.

FIG. 4.2 shows 13 basic relations.

FIG. 4.3 shows Case I, the node's interval does not overlap with any other node's interval in the path.

FIG. 4.4 shows the main operations used for inserting a new node or deleting an existing node: (a) left rotate (b) right rotate (c) flip colors.

FIG. 4.5 shows inserting new node, the states that can happen in rebalancing process.

FIG. 4.6 shows Case II, where the node's interval is contained by another node's interval in the path.

FIG. 4.7 shows deleting the node with minimum key.

FIG. 4.8 shows (a) $I_k$ overlaps with existing interval $I_i$. (b) Delete node $I_i$ and rebalance the tree. (c) merge $I_k$ and $I_i$: $I_z = I_k \cup I_i$ and find a place to insert $I_z$, (d) insert $I_z$ and rebalance the tree.

DETAILED DESCRIPTION

1. A Watershed Delineation Algorithm for 2D Flow Direction Grids 1.1 Introduction Watershed boundaries may be created from digital flow direction grids. Some create polygonal watershed boundaries using a flow direction grid approach by 1) creating a digital elevation model (DEM), 2) filling spurious sinks, 3) creating a flow direction grid, 4) burning in fluvial hydrological features (e.g., streams and rivers), and 5) using an accumulation of cell contributions across the landscape. The algorithms may substitute, for the last step, a general data structure and its corresponding labelling model called the modified nested set. A novel algorithm called the Haag Shokoufandeh Marching (HSM) may then be applied to retrieve watershed boundaries from the modified nested set (MNS) data model.

A modified depth first graph traversal algorithm may also be available for use. Starting at the root or the pour point in a D8 grid, the flow direction grid may be traversed and for each cell the discovery time, finish time, and distance from the root are recorded.

This disclosure describes a new technique to retrieve watershed boundaries from a D8 Flow direction grid. The HSM algorithm's retrieval complexity scales directly from the number of vertices necessary to delineate a watershed. Existing algorithms retrieve complexity scales in relation to the number of grid cells that make up the interior of the watershed boundary. Therefore, the HSM algorithm outperforms existing techniques geometrically depending on the shape of the watershed.

The modified nested set labelling allows local determination of the global watershed identity problem for any grid cell with an associated linear increase of storage costs. The only other data model that allows local determination of watershed identity may be the identity matrix as used in the SWAT model. The identity matrix stores every cell to cell relationship and therefore storage costs scales quadratically in comparison to the linear solution herein. Storage requirements for larger watersheds become too large to effectively use, for example in the Amazon River basin this results in a difference of 2*6.7 billion vs. (6.7 billion)$^2$ for the identity matrix vis-a-vis the nested set index with a 30-meter grid cell size.

1.2 Notations and Data 1.2.1 Notation

In use, we may use the HSM algorithm with a set of natural numbers 0, 1, 2, 3 for encoding cardinal directions North, East, South, and West, respectively. We apply the HSM algorithm to delineate watershed boundaries for any surface using a regularly spaced flow direction D8 grid as input. Within a D8 structure every grid cell may contain a value in $\{20, 21, \ldots, 27\}$ that denotes connectivity to one of its eight neighboring grid cells. We treat this flow grid as a graph (FIG. 1.1) $G=(V, E)$ whose vertex set $V=\{v1, v2, \ldots, vn\}$ may be congruent to grid cells and its directed edge set $E \subset \{\overrightarrow{(v_i,v_j)}|1 \leq i,j \leq n\}$ may be congruent to the flow direction values of individual vertices. Specifically, each node $u \in V$ has exactly one D8 corresponding to an outgoing flow to a cell v which will result in exactly one edge $e=\overrightarrow{(u,v)}$ in the edge-set E. Additionally, since each node in $v \in V$ corresponds to a regular grid cell, we can describe its location using index pair $p(v)=(x(v), y(v))$.

We create a secondary abstraction of the D8 flow direction grid to denote the lattice corners of each grid cell $v \in V$. Specifically, we use $\mathcal{L} =(\Lambda,\Gamma)$ to denote a regular square lattice, with the set $\Lambda \subset \mathbb{R}^2$ denoting the set of lattice points, and $\Gamma \subset \mathbb{R}^2 \times \mathbb{R}^2$ as the set of edges connecting lattice points. Similar to vertices of graph G, each lattice point l in $\Lambda$ may be uniquely identified by an index pair $(x(l),y(l))$. We assume without loss of generality that L may be a periodic lattice. A k-step lattice walk from lattice point p0 to lattice point pk may be a sequence $W=\{p0, \ldots, pk\}$ of elements in $\Lambda$ such that $\forall i \in (0, \ldots, k-1); (p_i,p_{i+1}) \in \Gamma$. We define F (certain Arabic alphabet characters may be substituted herein for their Greek or numeric pictorial analogs to make for ease of text reading) as the set of faces or cells of L and note that there may be an equivalence between the vertex set V of graph G and the set of faces F for lattice L. We note that the boundary of any watershed for lattice L may be a closed lattice walk (lattice cycle), i.e., p0=pk. Given a lattice point $l \in \mathcal{L}$, we use A(l), B(l), $\Theta$(l), and $\Delta$(l), if they exist, to donate its four neighboring lattice faces in F, i.e., vertices in G (see FIG. 1.2). Conversely, for a face $u \in \mathcal{F}$, we use the $\alpha$(u), $\beta$(u), $\delta$(u), $\gamma$(u) to denote its four boundary lattice points (see FIG. 1.6).

As a pre-processing step prior to running the HMS algorithm, we may apply the MNS algorithm to the D8 grid. This algorithm may associate two additional attributes of discovery time d(v) and finish time f (v) to each node $v \in V$. The attribute d( ) may be unique for every grid cell, while multiple grid cells can receive the same f ( ) value. FIG. 1.3 illustrates a D8 graph labelled with discovery and finish times using the MNS algorithm. Finally, the marching algorithm may receive as input any cell $v^* \in V$ and returns its watershed boundary in the form of a closed lattice walk $\Omega(v^*)$, made up of a list of lattice points in L.

1.2.2 Source Data

We applied the marching algorithm to the Delaware River Watershed using the Flow Direction Grid provided as part of the National Hydrography Plus Version 2 database (http://www.horizon-systems.com/NHDPlus/NHDPlusV2_02.php). We downloaded this dataset for the mid-Atlantic version region 02-A (EPA and Horizon Systems). The DEM was a subset based on the watershed boundary for the Delaware River Watershed with the root node (hydro sequence 200005438) and all stream reaches where the TerminalPa=200005438 or the confluence of the Delaware River with the Delaware Bay −75.35717, 39.2753. This resulted in a study area of ~36,000 km$^2$ (FIG. 1.4).

1.3 Method

Our algorithm relies on certain structural properties of a large flow direction raster grid. Specifically, we distinguish between root cells and internal cells of a flow grid. The root cells are identified as grid cells that flow into cells with null values (e.g. large bodies of water, oceans, and lakes), or off the grid. All other grid cells that flow through to cells with valid flow directions are internal cells. As discussed earlier, our marching algorithm uses an auxiliary data structure known as MNS that captures the hierarchy and nested structure of watersheds. The MNS data structure encodes the hierarchical complexity of a watershed using a pair of attributes, d(v) and f (v), for each cell v in flow grid G.

The marching algorithm receives as its input a vertex v* as its starting cell from the flow direction grid G and in incremental fashion builds the boundary of a complete vector polygon representing the watershed $\Omega(v^*)$ of all grid cells that drain through pour point v*. The polygonal chain $\Omega(v^*)$ may be a closed lattice walk defined on L, the dual lattice for flow grid G. The correctness of our incremental algorithm relies on the observations that every boundary grid cell of $\Omega(v^*)$, with a valid flow direction value may be guaranteed to have at least one adjacent neighbor that may be not in its watershed that the cell it flows into. For the initial cell v*, the incremental algorithm may be guaranteed to find adjacent lattice points belonging to $\Omega(v^*)$ (Proposition 1).

Proposition 1. Given an initial grid vertex v* with a valid flow direction in $\{2^0, 2^2, 2^4, 2^6\}$, the edge defined by the coincident lattice points between the initial vertex and the vertex it flows to define a polygonal boundary on $\Omega(v^*)$.

This in turn allows us to efficiently identify boundary lattice points and extend the chain $\Omega(v^*)$ (Proposition 2).

Specifically, starting at grid cell v*, its outgoing edge D8(v*) will be used to identify the lattice point(s) that share a boundary with v*. Note that if D8(v*) belongs to set {1; 4; 16; 64}, the cell v* and the destination cell of the edge D8(v*) share two lattice points, while for D8(v*) in {2; 8; 32; 128} share a single lattice point (FIG. 1.5). At each step, the algorithm identifies a new lattice point to extend the march (chain $\Omega(v^*)$) 130 based on the direction of the march (clockwise or counterclockwise) and the flow direction D8 attribute of the starting grid cell.

Proposition 2. Given an initial grid vertex v* with a valid flow direction in $\{2^1, 2^3, 2^5, 2^7\}$, the edge defined by the coincident lattice points between the initial vertex and the vertex it flows to identifies a lattice location that may be on the boundary of $\Omega(v^*)$.

Proposition 3. Given an initial grid vertex v* with a valid flow direction in $\{2^1, 2^3, 2^5, 2^7\}$, the edge defined by the coincident lattice points between the initial vertex and the vertex it flows into marks a lattice location that may be on the boundary of $\Omega(v^*)$. Further, this lattice location can be used to identify a lattice edge that may be on the boundary of $\Omega(v^*)$.

Proposition 4. Assuming the algorithm follows a counterclockwise for any lattice edges on $\Omega(v^*)$, one of its' four lattice neighbors can be used to create an edge that separates $\Omega(v)$. Moreover, the advance step can be carried in constant time.

While we have chosen to use a consistent counterclockwise probe as the reference direction in every step, the algorithm may be symmetric and would perform similarly irrespective of the consistent reference direction of incremental steps. Proposition 3 may be a consequence of this consistent walk.

Referring to FIG. 1.7, after identifying a starting lattice point, the march may continue by examining the immediate counterclockwise lattice point with respect to the previous move. For example, if the march starts by moving to the top right and the HSM march may be moving in the North direction (cardinal direction with value 0), the next boundary check will occur to the East (value 1). This first lattice march will identify the first edge (connection of two lattice points) on $\Omega(v^*)$. For the rest of the march, the two grid values may be used to determine the march direction. The HSM march after crossing an edge can move in one of three directions from its current lattice location. If the first edge may be oriented north, then the march can move to the west, north, or east. FIG. 1.7 in the top left hand corner shows the state of the HSM algorithm after it has crossed edge (p1, p2), because the HSM algorithm keeps the watershed on the left hand side grid vC may be inside $\Omega(v^*)$ a $v_D$ may be outside $\Omega(v^*)$.

At this step in the algorithm $v_A$ and $v_B$ are not yet know. In order to make the next step in the march the HSM algorithm uses the BoundaryPoint function to query $v_A$ and $v_B$ returning four possible states. The first is shown in FIG. 1.7 at the top center graphic occurs when neither $v_A$ or $v_B$ are in the watershed, in this case the march moves to the left of the previous move. The second is shown at the top right occurs when both $v_A$ or $v_B$ are in the watershed, in this case the march moves to the right of the previous move. The bottom right graphic shows what happens when $v_A$ may be in the watershed and $v_B$ may be not, the march moves forward in the same direction as the previous step. In the situation where $v_A$ may be not in the watershed and $v_B$ may be (bottom center and bottom right) a further piece of information may be necessary because both lattice edges p2, p3 and p2, p4 are on the watershed boundary $\Omega(v^*)$. We note that the HSM march should never cross a flow direction edge therefore if $v_A$ flows to $v_D$ or $v_D$ flows to $v_A$ we turn left if not we turn right.

In the worst case during each iteration of the march, the algorithm may examine two grid values (otherwise it would fold upon itself returning along the same edge it came in) and proceeds to identify the next lattice point that may be on the boundary of $\Omega(v^*)$. The algorithm terminates when it returns to the first lattice edge crossed during the march identifying a closed polygon. FIG. 1.8 illustrates the result of executing the algorithm on an example graph (starting at node v*=9). Proposition 5 formalizes the computational complexity of the marching algorithm.

Proposition 5. Every lattice point belonging to $\Omega(v^*)$ will be visited at most twice. This results in a $O(|\Omega(v^*)|)$ complexity for the marching algorithm.

Proposition 6. $\Omega(v^*)$ is made up of a closed polygon, therefore recursively running the HSM algorithm will eventually return to the original lattice edge.

The functions and algorithms are reproduced below.

Function 1. LatticeMove ($\ell$, $\mu$)

---

Function 1. LatticeMove (l, μ)

1: Input: Lattice point $l \in \mathcal{L}$ and μ direction $\in \{0,1,2,3,\}$. Here l is uniquely identified as $l = \wedge(x(l),y(l))$,
2: Output: new lattice cell l in direction μ.
3:
4: if μ == 0 then
5: W = A(l)
6: ε = B(l)
7: end if
8:
9: if μ == 1 then
10: W = B(l)
11: ε = ⊖(l)
12: end if
13:
14: if μ == 2 then
15: W = ⊖(l)
16: ε = Δ(l)
17: end if
18:
19: if μ == 3 then
20: W = Δ(l)
21: ε = A(l)
22: end if
23: W = BoundaryPoint(W, v*)
24: ε = BoundaryPoint(ε, v*)
25:
26: if W == T and ε == F then return $\wedge(x(l) + \delta x, y(l) + \delta y)$
27: end if
$\wp = (\mu + 1) \pmod 2$
28: S = $\lceil \mu/2 \rceil$
29: $\delta x = (-1)^{(1+S)}|\wp|$
30: $\delta y = (-1)^{(1+S)}|\wp - 1|$
31: return $\wedge(x(l) + \delta x, y(l) + \delta y)$

---

Function 2. Boundary Point ($v^t$, $v^x$)

---

1: Input: $v^i$ vertex cell $\in$ G and v* starting vertex $\in$ G:
2: Output: A Boolean indicating $v^i \in \Omega_{v^*}$:
3: value = False
4: if $d(v^i) \in [d(v^*), f(v^*)]$ then
5: value = True
6: end if
7:
8: return value Algorithm 1. Watershed Marching Algorithm (G, $\mathcal{L}$, v$^x$)

```
1:  Input: Graph G(V, E) such that ∀v ∈ V and Lattice 𝓛 such that ∀ l ∈ 𝓛:
2:     - v* has discovery, d(v), and finish, f(v), values computed by MNS algorithm.
3:
       - Lattice point l ∈ 𝓛 has unique grid coordinates pair Λ(x(l), y(l)),
4:
5:  Output: Watershed as a (cyclic) array of lattice points:
6:      Ω(v*) = (Λ(x₁, y₁), Λ(x₂, y₂), . . . , Λ(xₖ, yₖ), Λ(x₁, y₁), Λ(x₂, y₂)).
7:  C = (β( ), γ( ), γ( ), δ( ), δ( ), α( ), α( ), β( ))         ▷Aux. array of possible lattice functions
8:  𝒟 = (1, 1, 2, 2, 3, 3, 0, 0)                                 ▷Aux. array of possible cardinal transition directions
9:  idx = lg D8(v*)                                              ▷Aux. var for the index in arrays C and 𝒟
10: l_{v*} = C[idx](ρ(v*))           ▷Select the corner function          ▷Identify Starting Lattice location
11: Ω(v*) = (l_{v*})                             ▷Store the lattice coordinate pair in the final watershed
12: μ ← 𝒟[idx]                                                   ▷Store march direction state
13: while (Ω[1] ≠ Ω[|Ω| − 1] and Ω[2] ≠ Ω[|Ω|]) do     ▷Stop when the first edge is recrossed
14:     l, μ ← LatticeMove(Ω[|Ω|],μ).                            ▷apply march function based on direction
15: end while
16: Ω ← Ω[1, . . . , [Ω] − 1]                         ▷remove the duplicate vertex at the end of the polygon
17: return Ω
```

1.4 Results
1.4.1 Data Model Pre-Processing Cost

The cost to convert the original flow direction grid into the modified nested set model may be linear based on the size of the grid. The algorithm crosses every edge between grid cells exactly two times on the depth first graph traversal. The D8 flow direction grid only allows one edge (the downstream connection) for every grid cell (except for the root that has no edges), therefore the application runs in exactly (2n−1) where n may be the number of grid cells or polygonal catchments. The data structures G(V, E) and lattice L can both be derived from outputs of the modified nested set algorithm and therefore require no further processing or storage resources.

1.4.2 Data Model Storage Size

We can compare the size of the data model required to support HSM algorithm to the initial size of the input D8 flow direction grid. Because the algorithm relies on the original data to initiate the march, a reduction in size may be not possible. Conversely, because the attributes (discovery d ( ), finish f ( ), and x and y coordinates) are stored for every cell location the size of the final data set may be linear and constant with respect to the size of the initial grid cell.

1.4.3 Comparison to Existing Watershed Delineation Algorithms

The proposed HSM algorithm was compared to existing watershed creation algorithms for the 14,718 NHDPlus V2 catchments within the Delaware River Watershed. For each catchment the total query complexity for the generic grid processing algorithms was compared to the proposed HSM algorithm. Specifically, the number of 30 m grid cells that was required to process to create Ω(v*) was compared between the two approaches. We did not include in this comparison pre-processing steps but rather we assume as inputs to the original algorithm a standard flow direction D8 grid and to the HSM algorithm the discovery and finish time grids. We believe that this may be a valid approach because the conversion from raw DEM data to the sink filed D8 flow direction model requires multiple sweeps across the raw graph. The conversion to the discovery and finish time grid as required for this algorithm require two more sweeps across the entire grid and therefore this preprocessing step will run in linear constant time in relation to existing steps.

FIG. 1.9 illustrates the results for the comparison between the 14,718 catchments. The standard grid processing algorithm requires between 1 and ~34 million while the proposed algorithm requires between 1 and 44 thousand vertices (grid cells) to be processed. We fit a linear regression least squares model against the logarithm of $y=cx^b$ (ln y=ln c+b ln x) resulting in $y=0.1967x^{1.7986}$ with an $r^2$ value of 0.98. If we extend this equation to larger watersheds, for example the 6.1 million km$^2$ Amazon River, it would require 6.8 billion 30 meter grids cells while HSM would require 1.4 million marches. This may be a reduction of 99.97% read operations vs. known algorithms.

As the horizontal grid resolution of DEM decrease the proposed algorithms will outpace traditional techniques at a faster rate. For example, the 3 Digital Elevation Program (3DEP) being lead by the United States Geological Service (USGS) already provides 1 meter DEM datasets for select locations within the coterminous United States. When this resolution data becomes available for the Amazon river basin, it will turn the original 6.1 billion grid necessary to delineate the Amazon basin into a 5.5 trillion grid. This is caused by the fact that DEMs increase in resolution geometrically (e.g. the difference in size between 30 meter DEM and 1 meter DEM may be $(30/1)^2)=900$. Applying our linear regression model FIG. 1.9 we estimate that the proposed algorithm would need to visit roughly 28 million grid cells. The higher the DEM resolution the larger the advantage the HSM algorithm has compared to existing data structures.

1.5 Discussion
1.5.1 Complexity Reduction

The observed reduction in computational complexity may be consistent with the observation that the proposed algorithm has the same complexity as the watershed boundary or to put it another way in the length of the polygonal chain Ω(v*). In contract, existing algorithms scale in proportionality to the area of the watershed. We expect that based on the watershed shape the proposed algorithm retrieval complexity would be geometrically smaller then existing techniques. Empirical tests conducted within the Delaware River Watershed show a geometric reduction in processing time in FIGS. 1.9 and 1.10. When we extend the empirical results to other watershed we predict considerable, 99.9%, reduction in computational complexity. Additionally, the advantage that the HSM algorithm has vs existing techniques will become more prominent as DEMs continue to increase in resolution. For example select parts of the Conterminous United States already have 1 meter DEMs as part of the USGS Three Dimensional Elevation Program. This will result in a data-set with 900 times the number of nodes that were used in this analysis.

2. Creation of a Data Model to Retrieve Constrained Watershed Boundaries

2.1 Introduction

This section describes a general model for retrieving constrained watershed boundaries for any location (grid cell or pour point) within a flow direction grid (FDG). Watershed modelling may be an important computational problem that allows researchers to relate upflow parameters to conditions within fluvial systems (streams, rivers, lakes, and oceans). Others consider watersheds retrieval as the "basic modelling element" for numerous hydrological problems. Delineation and retrieval of watershed boundaries are also utilized in a number of disciplines including engineering, urban infrastructure, ecological, and biological among many others.

There are two primary scales that have been used to relate upstream conditions (e.g., Land Cover, Point Sources, terrestrial conditions and others) to fluvial water quality variables within Geographic Information Systems. The most general one may be at the catchment or watershed scale that delineates the continuous surface where precipitation will eventually funnel through a point. This may be normally done by delineating watersheds (retrieving) from digital elevation models (DEMs) by converting them into flow direction grids (D8, D-Infity) and others. In a secondary spatial approach, the stream reach may be used to quantify a more local connection to fluvial impacts. Stream reaches and their associated local catchments are defined as segments of streams that share similar characteristics (soils, slope, vegetation), and the local catchments may be defined as the polygonal area that delineates non-fluvial or non-channelized flow into the reach. The National Hydrography Data-set Version 2 uses the local stream reaches (catchments) and the entire watershed to help users compare instream measurements to landscape parameters. The EPA stream catchment database provides precomputed attributes for 2.6 million at the stream reach and watershed scale.

The proposed method allows the user to quickly extract flow boundaries or constrained watershed boundaries using any flow distance from a user defined pour point, and it also provides the ability to build subsets of the stream catchments, enabling water flow based segmentation similar to a GIS based buffer analysis using multiple buffer distances. Taken together, these allow users to efficiently and accurately extract a constrained watershed for any input location within a valid hydro-enforced D8 FDG (FIG. 2.1).

The constrained watershed model described herein may be a variation of the HSM algorithm discussed in Section 1. A general watershed retrieval algorithm that returns watershed boundaries in linear times, O(n), in terms of number of vertices, n, may be found on the boundary of the watershed. The HSM algorithm has been shown to be quadratically faster in comparison to existing watershed retrieval algorithms available in general purpose hydrologically tools (e.g. Gage Watershed from Taudem or ESRI's watershed function). The general approach to retrieving a watershed boundary using a flow direction grid may be 1) Building a Digital Elevation Model, 2) Filling sinks, 3) Creating a flow direction grid. Traditional watershed delineation algorithms (e.g. Gage Watershed from Taudem or ESRI's watershed function) traverse the flow direction grid identifying grid cells that flow through the submitted pour point. After all of the grid cells are identified, the output watershed boundary may be retrieved by running a grid to vector operation resulting in an array of coordinates pairs (vector nodes) that represent the output polygon.

2.2. Related Work

Applying the constrained watershed variant of the HSM algorithm requires the input data-set in the form of a hydrologicaly corrected D8 flow direction grid. A corrected D8 FDG may have its sinks filled and stream center-lines burned through dam like structures (breached) to ensure a topological drainage surface where all water precipitating on land eventually flows to a large body of water (e.g., sea, ocean, and or lake). These processing conditions can cause issues in some physical environments such as karst or anthropomorphic underground drainage networks (e.g., drainage pipes, stormwater basins). Using sink-filled and burned-in hydrological channels may be a common practice in the watershed retrieval and modelling domain. In earlier work, we described the similarities between graph data-structures used in the computational sciences and the D8 flow direction grid. Namely, D8 grids, when sink filled and hydro enforced, are specific types of graphs know as Directed Acyclic Graphs (DAGs). Further, D8 FDGs that do not allow divergent flows will result in combinatorial tree structures, where each grid cell location can be abstracted as a vertex and each value in the D8 grid will correspond to an edge in the resultant graph tree.

Before describing the variation of the HSM algorithm (hereafter the constrained HSM or CHSM) in detail, we will discuss the common notation and structures used throughout the rest of this section. These notations follow Section 1 above but in case of any inconsistency will be repeated herein. We use the natural numbers 0, 1, 2, 3 for storing cardinal directions North, East, South, and West, respectively. We apply the CHSM algorithm to delineate watershed boundaries for any surface using a D8 flow direction grid as input. Within a D8 structure every grid cell may contain a value in $\{2^0, 2^1, \ldots, 2^7\}$ that denotes connectivity to one of its eight neighboring grid cells. Additionally, since each node in v∈V corresponds to a regular grid cell, we can describe its location using index pair $p(v)=(x(v), y(v))$. Lastly, we added one new attribute for all v in G, the distance from the root as t(d) and a constant scalar value δ which denotes the maximum distance that water can travel to be considered within the watershed.

The Modified Nested Set (MNS) structure may be applied to the D8 grid (FIG. 2.2) resulting in a discovery and finish parameters for every grid-cell (FIG. 2.3). The nested set algorithm may be modified for the hydrological domain. The discovery value may be a unique integer label for each node v in the D8 grid, and it may be found using a modified depth first search (DFS) traversal from the root of the tree G associated with D8 FDG. The finish value of a node v may be the largest discovery value of any node above v during the DFS conducted by the MNS algorithm.

FIG. 2.3 represents the discovery (left panel) and finish times (right panel) for the vertices of the D8 grid in FIG. 2.2, respectively. In this section, we describe a special case of HSM algorithm that supports restrictions including the distance from root and one additional Boolean condition that will allow the retrieval of a constrained watershed. FIG. 2.4 shows a third labelling value necessary to retrieve the constrained watershed boundary, the distance from the root. We will assume the existence of an additional labelling t(v) for every node v. These labels are distance attributes that can be computed using a depth first traversal, where each step deeper into the graph (away from the root) adds 1 to the depth, and every step towards the root reduces the distance by one (to accurately measure distance we need to differentiate between orthogonal (D8=1, 4, 16 and, 64) and diagonal (D8=2, 8, 32, 128) moves, but for this case, we show only distance from the root in the DFS.

2.3 Method

The HSM algorithm returns a watershed boundary by accepting as input a grid cell v* and a D8 graph G where its vertices are labeled with discovery and finish-time. Using this information, the HSM algorithm marches around the watershed identifying valid edges and returning to the original starting location v*.

Intuitively, at each step of the march the algorithm will identify a valid march direction based on a Boolean inclusion condition, where a vertex may be deemed as exclusively on the boundary of the watershed boundary if and only if its discovery value may be between the range of the original pour points discovery and finish value. It does this by repeatedly calling the BoundaryPoint function which returns a Boolean value for the two grid cells in front of the current march location. Based on the 4 possible combinations of the BNP function calls and without a loss of generality assuming the previous march step was towards the north if both BNP are True then the march moves to the east, if both are false towards the west, if the right hand cell may be False and the left hand cell may be True then towards the north, and finally if the right hand cell may be True and the left hand cell may be False then the march can either move to the west or to the east. We have shown that this may be a necessary and sufficient condition that can be examined in constant time in every step of the algorithm by asking at most three Boolean questions of the MNS labelled grid. FIG. 2.5 shows an example output from the endpoint of the HSM algorithm for the Chesapeake Bay Watershed (10) 30 m FDG. See Section 1 and the Function 1, Function 2, and Algorithm 1 for a review of the HSM algorithm.

The incremental marching HSM algorithm at each iteration extends the current watershed boundary of a pour point v* by identifying the next candidate grid cell it. Specifically, it uses a Boolean function, BoundaryPoint, to examine the whether a given grid cell vi may be a within the watershed boundary or not. The function makes use of a structural property for any cell point with respect to discovery and finish-time of pour point v*. Specifically, the necessary condition for point $v^i$ being part of watershed of v* may be that its discovery time $d(v^i)$ must belong to the interval $[d(v^*), f(v^*)]$ that are within the watershed for a pour point v*. It may be this latter condition that BoundaryPoint will examine and depending on the outcome will return a value of True or False.

The modified version of BoundaryPoint function may enforce an additional constraint while examining the necessary condition for vertex $v^i$. Namely, we assume the algorithm will receive distance parameter σ and will verify that in addition to $d(v^i)$ belonging to the interval $[d(v^*), f(v^*)]$ the distance between v* and $v^i$ does not exceed σ. To verify this latter constraint we will assume access to an distance function $d(u, v) = \|u-v\|_2$ for every pair of cell points u and v. The Boolean function ConstrainedBoundaryPoint may be realization of the above description:

---

Function ConstrainedBoundaryPoint($v^i$,v*,σ)

1: Input: $v^i$ vertex cell ∈ G and v* starting vertex ∈ G:
2: Output: A Boolean indicating $v^i$ ∈ $\Omega_v$*:
3: value = False
4: if $d(v^i)$ ∈ $[d(v^*), f(v^*)]$ and $(t(v^*) + \sigma) \leq t(v^i)$ then
5:     value = True
6: end if
7: return value

---

To illustrate the utility and performance of our algorithm, we have created a simple empirical experiment for the Chesapeake Bay watershed FDG provided as part of the National Hydrography Data-set V2. We compared the computational complexity of the CHSM algorithm and that of custom ESRI analysis by measuring the number of grid cells required to return a common result for differing values of t (the distance from the root) keeping the root location constant (Latitude=37.025378, Longitude=−75.993728 in World Geodetic System 1984 (WGS 84)) as shown in the FIG. 2.5 location map.

TABLE 1

Results Comparing traditional processing techniques to the CHSM

| | Constrained Distance (km) | | | | |
|---|---|---|---|---|---|
| | 1,160 (max) | 1,000 | 500 | 125 | 62.5 |
| Traditional Grid Techniques Complexity | $1.97e^8$ | $1.89e^8$ | $8.89e^7$ | $3.17e^7$ | $8.90e^6$ |
| CHSM Complexity | $1.65e^5$ | $1.22e^5$ | $7.45e^4$ | $5.48e^4$ | $2.21e^4$ | algorithm for the 30 m FDG provided as part of the National Hydrography Dataset Version 2 (10) using differing distance constraints

2.4. Conclusions and Future Work.

Comparing upstream attributes to fluvial conditions at any location may be typically done at one of the two scales; the watershed or the stream reach. In this section, we have proposed a new technique and its associated algorithm and data structure(s) to compute the constrained watershed for any location within a flow direction grid. Other variations of the constrained watershed problem could be used to extract various polygonal surfaces from flow directions grids (or any raster data-sets). For example, given a riparian zone defined as contiguous wetland, riparian zones, or open water, the constrained watershed algorithm could return those boundaries with respect to a starting location on the boundary of the riparian zone. In general, the marching algorithm can be used to return any contiguous grid surface that can be characterized through a first-order Boolean condition. A number of raster to vector problems could be reformulated in terms of marching algorithms (some are already similar to retrieval of contour lines from DEMs). The CHSM algorithm can be run using a standard PC or even a handheld device like a mobile phone in seconds for the largest test case in this example.

It may be possible to sum upstream attributes for any watershed in O(n) where n may be the number of cells in the flow direction grid. This complexity may be similar to that of preprocessing costs for the creation of the sink filled and breached DEM, and the MNS data-structure. Calculating attributes for the constrained watershed will require a more complex algorithm, and we have had preliminary investigation on using column or row summed values to quickly extract summary statistics during the HSM or CHSM algorithms. For sparse data-sets such as the National Pollutant Discharge Elimination System (NPDES) another solution may be to spatially join the point location with the MNS discovery attribute, which would allow all points sources to be retrieved from a watershed in $2 \log_2 n$, where n denotes the number of NPDES points, if the NPDES points where stored in a sorted array by the grid cell discovery values.

3. A Fast Technique to Delinate Watershed Boundaries for a Polygonal Object

3.1 Introduction

Retrieving watershed boundaries from digital elevation models may be a heavily studied field providing important information to the management of natural and anthropogenic systems. The transformation from desktop-based systems to online cloud based decision support tools has allowed non-technical users to run models that are designed to mimic natural processes. For example, the model web application herein allows users to retrieve and describe watershed boundaries based on digital elevation models and grid-based estimates of land use and land cover these systems have been built to provide information in retrieval times consistent with modern web browsing preferences (seconds to minutes).

A number of efforts have been made to return watershed boundaries to support these decision support systems. Cyber tools and associated algorithms are designed to return watershed boundaries in an efficient (fast) way for a singular drainage location. In this section, a data structure is paired with the refined version of the HSM algorithm proposed above in Sections 1 and/or 2 to return the closure of the watershed boundary all vertexes intersected by the input geometry.

This new algorithm and associated data structure may allow the creation of cyber resources to retrieve watershed boundaries for any simple geo-spatial object (point, line, or polygon). This may be an important advance as techniques developed to retrieve watersheds based on a single drainage location normally rely on partially solving watershed boundaries (wiki-watershed or USGS stream stats), and therefore may not be amiable to the line or polygon form without additional computational costs. The method we discuss in this section returns watershed boundaries using the marching method, walking around the watershed boundary never either entering into or leave the watershed.

3.1.1 Problem

Traditional methods to delineate watershed boundaries use a pour point or outlet point to describe the location at the bottom most flow of the watershed (ArcHydro, TauDEM, GRASS, etc.). This point may be snapped to the flow direction raster (FDR) to obtain the raster pixel where flow will be calculated for. Traditional algorithms then initiate a flow path tracing algorithm, across a digital flow direction grid. We are only aware of one commercial software implementation that can return watershed boundaries for polygonal or linear objects instead of for singular input locations.

In order to obtain the contributing flow for a polygon, its boundary vector may be converted to raster and snapped to the FDR and each cell may be evaluated for the total contributing flow area. For polygons with large drainage areas this method can be very computationally expensive. Using ESRI's ArcHydro tools, this method also requires enough hard disk storage to accommodate three times the size of the FDR as the result of converting the polygon to raster must have the same extent and rows and columns as the FDR. If the FDR may be spatially large, this equates to storing another equally large raster for the polygon areas. After the Watershed tool may be run, a third equally large raster may be created for the contributing flow area to the polygon area of interest. This raster may be then converted to a vector for the watershed boundary and the intermediate rasters may be deleted. ESRI may be able to avoid storing large rasters by the utilization of a compressed GRID format, which decreases file size from an order of gigabits in size to megabits. The ESRI algorithm creates the watershed boundary by appending 1's onto a grid of 0's as more cells are determined to be within the watershed. GRIDs utilizing only 1's and 0's are easily compressible by a variety of available compression algorithms.

Multiple test cases were carried out comparing performance and accuracy of the new watershed boundary retrieval verse the method used in ESRI's ArcHydroTools. In even the most simple case, the process in ESRI needed 60 seconds to complete, whereas the new algorithm takes only a few seconds. As the size of the input and watershed increases, the difference in processing time varies exponentially.

3.2 Material and Methods

3.2.1 Notation

With reference to FIG. 3.1, the proposed Watershed Marching Algorithm polygon input (WMA-P) takes as input a polygon P and a grid G. Polygon P may be represented as a piece-wise list of vertexes stored $<v_1, v_2, \ldots, v^i>$, each identified by its (x, y) coordinates in $R^2$. and a regular grid G with n×m cells, each of which may be a subset of $R^2$. Without loss of generality, we will use the notation G[i, j] to denote the cell located at column $i \in \{1, \ldots n\}$ and row $j \in \{1, \ldots, m\}$ of grid G. We will assume each cell G[i, j] has a set metadata including a direction value d8[i,j], discovery value d[i,j], and finish value f[i,j]. For a detailed description on how these metadata values are calculated, you may refer to the above sections. We create a secondary abstraction of the regular G grid to denote the lattice corners of each grid cell $v \in V$. Specifically, we use $L=(\Lambda, \Gamma)$ to denote a regular square lattice, with the set $\Lambda \in R2$ denoting the set of lattice points, and $\Gamma \subset R^2 \times R^2$ as the set of edges connecting lattice points.

The algorithm may return the watershed boundary, in the form of a closed lattice walk $\Omega(P^*)$, made up of a list of lattice points in L.

Lastly, the WMA-P algorithm uses an auxiliary data structure called a modified range tree MRT that may be built during the processing steps and may be created and used but not returned. MRWT may be used to represent the list of discovery and finish values that are intersected by P across G.

The cells that intersect with P are denoted by $c_i$, $i=1, \ldots, n$, where n may be the number of the cells that intersect with P. We denote the nodes of the MBT with $t_i$, $i=1, \ldots, m$, where m may be the number of nodes in the MBT. Each node of the tree, similar to the grid structure discussed above, has an attribute, called interval, denoted by the interval $[d(t_i); f(t_i)]$.

The related algorithms, which are modifications of those above in Sections 1 and 2, are shown below.

---

Algorithm to create the Modified Balanced Range Tree P
Algorithm 1 Intersect A helper algorithm to determine if a range represented as a Discover D and Finish F pair [D, F] intersects a node from a modified binary range tree

---

1: IF F < Dn
2:    Return 0
3: IF D > Fn
4:    Return 1
5: IF Dn < D And F < Fn
6:    Return Return ---
--Algorithm 2 Insert _MBRT: A procedure for inserting a Discover
D and Finish F value pair into an existing Modi_ed Binary Range Tree.
---
1:     Input: A valid Modified Binary Range Tree MBRT, and a discovery
       D and Finish F value pair.
2:     Output: A valid Modified Binary Range Tree.
3:     For i =1 to n with increments of 1
4:        For j = 2, to m with increments of 1
5:           F[i, j] = F[i, j − 1] + M[i, j]
6:        end
7:     end
---

4. Modified Interval Search Tree with Non-Overlapping Interval Constraint 4.1 This section focuses on a Modified Binary Interval SearchTree (MBIST) data structure for maintaining a dynamic subset of intervals in R that also supports efficient methods for search. In addition, the MBIST T may support efficient probes to test where a single value $x \in R$ intersect the set covered by T. A balanced MBIST may be built from a list of un-ordered and overlapping intervals, where by its construction the number of intervals in the input may be often much larger then the number of intervals stored in the MBIST (FIG. 1). The models proposed in this manuscript are designed to be run online, limiting the total space required to store the input set and T.

Our method uses certain existing structures to ensure a balanced structure. Specifically, we will use properties Red-Black Red Black Trees and Left Leaning Red-Black Trees as baseline for implementing MBSITs. These methods ensure an complexity bound of $\Theta(\log n)$ on search, insert, and delete operations. We extend and modify these techniques, applying them to an MBSIT where its nodes maintain intervals of the form $[f,d] \subset R$ as their key values.

The proposed data structure has been designed to generalize earlier methods for storage and retrieval of watershed boundaries from vector and grid data structures mentioned above.

The previous work primarily focused on retrieval of watershed boundaries for a single, unique location (x, y) by marching around the outer geometric boundaries of the watershed. These algorithms retrieve objects in linear time in relation to the boundary length of an object compared to other techniques with a complexity proportional to the area of the watershed object. The proposed MBSIT data structure may be designed to allow the generalization of the above algorithm for the closure (watersheds) for multiple query nodes (e.g., polygon or linear geometric structures).

4.2 Problem and Notation

In this section 4, we focus on providing an efficient data structure to build a Modified Binary Interval Search Tree (MBIST) where each nodes has an interval as its key. The goal is to efficiently construct a MBIST with the minimum number of sorted non-overlapping intervals so that the union of the intervals over all nodes' key of the tree may be equal to the union of list of the intervals. We denote each interval I; with $[d_i, f_i]$ so that each interval represents a set $\{d_i, d_i+1, \ldots, f_i\} | (d_i \le f_i), (d_i, f_i \in R)$ so that the intervals are comparable. Our compare operation determines whether a given interval intersects, or may be less than or greater than another interval. If we consider $I_a = [d_a, f_a]$ and $I_b = [d_b, f_b]$, all possible relations are illustrated in 2. We condense these 13 possible relations into four unique cases, pre-cedes, contains, intersects, or preceded by. Intersects contains a number of Allen's cases including meets, overlaps, finished by, starts, equals, started by, during, finishes, overlapped by, and met by. Based on the four possible relations between intervals, we describe a method to guaranteed to generate a balanced binary search tree with non-overlapping intervals.

The MBIST may be constructed online by inserting, deleting, and merging nodes, one at each step. This process may use the following operations depending on the relation between the new node and the existing nodes within the MBIST:

search the MBIST to check if a given interval intersect or may be contained by any existing interval in the tree.
    Insert a node with an interval key into the balanced binary interval tree.
    Merge nodes with an overlapping intervals to maintain a balanced binary tree with non-overlapping intervals
    Delete a node 4.3 Materials and Methods We use a Balanced Binary Search Tree (BBST) as the basis of our data structure. We use Left-Leaning Red Black-Tree (LLRB) to model the Balanced Search Tree (BST). LLRB makes guarantees on the complexity of a number of common operations including search, insert, merge and delete. LLRB trees are a variant of red-black tree that are simpler to implement then traditional RBT. In LLRB, each edge may be assigned a color (red or black) as opposed to red-black tree that assigns color to the nodes. The color assignment may be used to control the balance of the tree by putting constraints on the operations used in constructing the modified balanced interval search tree:

Two consecutive red edges are not allowed in any path from the root to a leaf.
    The number of black edges are fixed on the paths from the root to any leaf.

4.3.1 Creating a Modified Binary Interval Search Tree from a List of Intervals

Thorough this section, a non-degenerate interval I= $[d,f] | d \le f$, may be a non-empty subset of R. We use the notion of the disjoint interval family to represent a set of $I = \{I_1, I_2, \ldots, I_n\}$ of n non-degenerate intervals with $I_i \cap I_j = \emptyset$, for all $1 \le i < j \le n$. It may be our objective to design a data structure to represent the family I using a MBIST T. A requirement of the data structure may be its support for dynamic operations including insertions and deletions. We will assume that these operations can be invoked in any order. In the case of insertions, the new interval with some the existing intervals in set I, which may result in further processing to maintain the integrity of disjoint family I. In our implementation, each interval may be stored as the key values of the nodes T. Assuming a temporal order of insertion on the elements of I, the initial interval $I_1$ will be add as the root of the T. Adding every other node to the MBIST can be divided into two stages: First, we search within the existing MBIST to determine if the interval may be unique or if it overlaps or may be contained by an existing interval. Starting from the root we compare the interval $I_k = [d_k, f_k]$ to each node's key in the tree following the BST property. The comparison falls in one of the four categories explained in section 4.2. If the new interval $I_k$ does not intersect with the interval $I_i = [d_i, f_i]$ of the current existing node of the MBIST, we compare $d_k$ with $d_i$. If $d_k$ may be less than $d_i$, we go to the left subtree, else we go to the right subtree. Following this rule, several cases may happen in the path from root to the leaf:

Case I) The algorithm reaches no node which its interval overlaps with the new interval $I_k = [d_k, f_k]$ i.e. all node in the path fall in "No Intersect" category when compared to $I_k$.

Case II) The algorithm reaches a node that its key $I_i = [d_i, f_i]$ contains the new interval $I_k = [d_k, f_k]$ i.e. the relationship between $I_i$ and $I_k$ falls into "Contained" category.

Case III) The algorithm reaches a node that its key $I_i=[d_i,f_i]$ inter-sect with the new interval $I_k=[d_k,f_k]$ i.e. the relationship between $I_i$ and $I_k$ falls into "Overlap" category.

FIG. 4.3 shows an example of this case.

In case I, the algorithm reaches a node with no right or left subtree. In this case a new node with key Ik will be inserted in its place using a red edge. After inserting a node, the MBIST tree will be re-balanced. The basic operations that help to maintain balance are "left rotate", "right rotate" and "flip colors". LLRB requires that the red edge always lean to the left Sedgewick (2008a). Therefore in the case that the new inserted node may be a right child of its parent "left rotate" operation may be used as shown in FIG. 4.4 in frame (a). If the new inserted node or the "left rotate" operation from the previous step of re-balancing violates the invariant property of the LLRB tree i.e. causing two consecutive red edges both leaning on left, "right rotate" operation may be used as illustrated in FIG. 4.4 frame b. In addition, the new node might be inserted as a right child of a parent node which its left child has red edge. This situation can be encountered after "right rotate" operation as well. In this case the color of children edges will be flipped to black and the color of the edge attached to the parent node will be flipped to red. In other words, Flipping colors passes red edge up one level. This situation and the result of "flip colors" has been illustrated in FIG. 4.4 frame (c). If "flip colors" operation causes two consecutive red edges, "rotate right" operations may be used to maintain invariant properties of the LLRB. "Flip colors" may cause a right leaning red edge. This situation will be resolved with "rotate left". Therefore, starting from the new inserted node with red edge we repeatedly use one of the operations to maintain left leaning red edges and its invariant properties. These operations are used to pass a red link up in a LLRB tree in order to re-balance the tree. FIG. 4.5 shows the states that may happen in inserting a new nodes and its re-balancing process.

In case II, according to our initial goal for designing a data structure with non-overlapping intervals, no insertion or deletion may be needed. FIG. 4.6 shows an example of this case.

In case III, the node with key Ii must be deleted from the MBIST tree. To delete an internal node, the node's key will be replaced with the key of its successor i.e. the minimum node in its right subtree. Then the successor will be deleted. To delete a leaf node, if the node may be attached with a red edge, it will be removed easily. Otherwise a red edge should be pushed down the tree. "Left rotations", "right rotations" and "flip colors" will be used on the way down search path to push red edge right or left so that the edge attached to the leaf node getting deleted flips to red. Then the node will be deleted. Starting from the deleted node, the rotations and color flip operations will be used on the way up to fix right leaning red edges and consecutive red edges which are not allowed. FIG. 4.7 illustrates the operations required to delete the minimum node of a tree as an example.

The interval $I_i$ will be merged with $I_k$ using Algorithm 4.1 (below) and results in interval $I_z=[d_z,f_z]$. The new interval will be inserted in to the MBIST tree starting from the root as we explained earlier. FIG. 4.8 shows an example of this case. The whole procedure of building the MBIST may be illustrated in algorithm 4.1 also below.

---

Algorithm 4.1 Merge A helper algorithm to merge two overlapping intervals

---

1: Input: Two overlapping intervals each with a left-bound d and right-bound f value, i = $[d_i, f_i]$ and k = $[d_k,f_k]$.
2: Output: A single valid range z = $[d_z,f_z]$.
3: If $d_i > d_k$ 4: $d_i = d_k$
5: If $f_k > f_i$ 6:
      $f_i = f_k$
7: Return z = $[d_i,f_i]$

4.4 Complexity Analysis for Building and Searching T

4.4.1 on the Complexity of Searching T

Given a valid T with s nodes and a range $I_k=[d_k,f_k]$, searching the tree to find if a single value stabs (intersects) an interval T takes O(log s). MBIST may have two properties inherited from LLRB: (1) the number of black edge are fixed on any paths form the root to a leaf and (2) two consecutive red edges are not allowed in any path from the root to a leaf. Therefore, the shortest path in T contains only black edges which results in the length of log s. The longest path from the root to a leaf can be no longer than 2×log s which happens when the path contains alternating red and black edges. Searching the tree for overlapping node's key with the given interval, includes starting from the root, comparing the given interval with the node's key and recursively going to left or right subtree according to the result of the comparison. In the worst case, the longest path should be travelled to find if $I_k$ overlaps with any node in the tree. This procedure has the worst case complexity of O(log s).

Further Algorithms 4.2-4.4 with functions as described are shown below.

---

Algorithm 4.2 Update A helper algorithm to insert an input interval

---

$I_k$ with left-bound $d_k$ and right-bound $f_k$ pair $I_k = [d_k,f_k]$ in an MBIST subtree Twith root $I_i$
1: Input: A single node $I_i$ from a MBIST T with its associated key interval
$I_i = [d_i,f_i]$ and an input interval $I_k = [d_k,f_k]$.
2: IF i = Ø-->This may be the insert case
3: $[d_i,f_i] = [d_k,f_k]$ -->Add range k to T at position i
4: Return
5: IF $f_k < d_i$-> This maybe"No Intersect" case
6: Update $(LC_i,S)$ --> $LC_i$ represents the left child of node i∈T
7: IF $d_k > f_i$-> This maybe"No Intersect" case
8: Update$(RC_i,S)$ --> $RC_i$ represents the right child of node i ∈ T
9: IF $d_i ≤ d_k$ And $f_k ≤ f_i$--> This maybe"Contained" case.
10: Return--> Do nothing.
11: Else-->This may be "Intersects" case.
12: delete(i) --> Delete node i from T
13: Update(root(T ),merge(i,k))

---

Algorithm 4.3 Build _MBIST: A procedure for building a Modified Binary Interval Search Tree.

---

1: Input: A set K of left-bound d and right bound f value pairs so that
K = $\{[d_1,f_1], [d_2,f_2], [....], [d_n,f_n]\}|(d_i ≤ f_i), (d_i,f_i ∈ R)$.
2: Output: A MBIST T.
3: T = Ø--> Initialize an empty MBIST
4: For k ∈ K
5:       Update(root(T ),k)
6: Return T

| Algorithm 4.4 Stab: A procedure to check if a value j stabs a node's interval from T. |
|---|
| 1: Input: A node I in a MBIST, and a value j ∈ R.<br>2: IF I = ∅<br>3:         Return FALSE--> If the node may be empty the interval does not intersect a range<br>4: IF $d_i \leq j \leq f_i$<br>5:         Return TRUE-->True if j stabs the current range<br>6: IF $j < d_i$<br>7:         Stab(LC(I),j) --> Search the left child<br>8: Else<br>9:         Stab(RC(I),j) --> Search the right child |

| Algorithm 4.5 Stabs _MBIST: A procedure for check if a value f stabs any interval in a MBIST T. |
|---|
| 1: Input: A valid MBIST T and a value j.<br>2: I = root(T)<br>3: Return Stab(I,j) |

4.3. Complexity of Constructing an MBIST

Given an un-ordered list I of overlapping ranges I= $[I_1, I_2, \ldots, I_n]$ where each $I_k$ may be a unique interval $[d_k, f_k]$ and $d_k, f_k \in R$, building an MBIST tree has the worst case complexity of n log(n).

The worst case scenario happens when no interval intersect with the others. To build an MBIST tree the nodes are inserted one by one. The insertion process includes searching for the right position to insert the node and re-balancing the tree to maintain the balance. Given that the tree can have at most n nodes in this case, the depth of the tree can be at most 2 log n. Inserting a node in the MBIST tree has the complexity of O(log n). Therefore building an MBIST tree has the complexity of n log n in the worst case.

While the invention has been described with reference to the embodiments described herein, a person of ordinary skill in the art would understand that various changes or modifications may be made thereto without departing from the scope of the claims.

The invention claimed is:

1. A method for delineating a boundary of a watershed, the method comprising:
receiving a pour point of the watershed and coordinates of confluence of the watershed in a larger watershed;
creating an abstraction of a flow direction grid G based on the pour point, wherein the abstraction denotes at least one lattice point of each grid cell of the watershed;
applying a modified nested set (MNS) to the abstraction of the flow direction grid G, wherein the MNS captures hierarchical complexity and nested structure of the waterbodies;
applying a Haag Shokoufandeh Marching (HSM) algorithm on the MNS applied flow direction grid, which creates the boundary of the watershed by marching around an edge of the watershed and never entering an internal area of the watershed, wherein HSM relies on structural properties of a raster grid comprising root cells and internal cells, wherein the root cells are raster grid cells that flow into cells with null values, and wherein the cells with null values are associated with the water bodies;
identifying a valid march direction based on a current march location of the HSM algorithm based on the application of the HSM algorithm; and
identifying the lattice point to extend the march based on the march direction and the MNS applied flow direction grid for delineating the boundary of the watershed.

2. The method of claim 1, wherein all other grid cells that flow through the cells with valid flow directions are the internal cells.

3. The method of claim 1, wherein the HSM algorithm comprises a MNS data structure that uses a pair of attributes, d(v) and f(v), for each cell v in the flow direction grid G, wherein d(v) denotes a discovery time of a respective cell and f(v) denotes a finish time of the respective cell,
wherein the HSM algorithm receives as its input a vertex as its staring cell from the flow direction grid G and in incremental fashion builds the boundary of a complete vector polygon representing the watershed $\Omega(v^*)$ of all grid cells that drain through pour point,
wherein a polygonal chain is a closed lattice walk defined on a lattice L, a dual lattice for the flow grid G, and
wherein the correctness of the HSM algorithm relies on observations that every boundary grid cell of $\Omega(v^*)$, with a valid flow direction value is guaranteed to have at least one adjacent neighbor that is not in the watershed that the cell it flows into.

4. The method of claim 3, wherein for an initial cell $v^*$, an incremental algorithm is guaranteed to find the adjacent lattice points belonging to $\Omega(v^*)$.

5. The method of claim 4, wherein the HSM algorithm follows Proposition 1: Given an initial grid vertex $v^*$ with a valid flow direction in $\{2^0, 2^1 \ldots 2^7\}$ at least one of the 4 adjacent lattice points will be coincident on a polygon boundary representing $\Omega(v^*)$.

6. The method of claim 5, wherein the HSM algorithm further follows Proposition 2: Given the initial grid vertex $v^*$ with the valid flow direction in $\{2^1, 2^3, 2^5, 2^7\}$, an edge defined by coincident lattice points, between the initial grid vertex $v^*$ and a vertex, identifies a lattice location on the boundary of $\Omega(v^*)$.

7. The method of claim 6, wherein the HSM algorithm further follows Proposition 3: Given the initial grid vertex $v^*$ with the valid flow direction in $\{2^1, 2^3, 2^5, 2^7\}$, the edge defined by the coincident lattice points marks the lattice location on the boundary of $\Omega(v^*)$.

8. The method of claim 7, wherein the HSM algorithm further follows Proposition 4: Given the HSM algorithm follows a counterclockwise for lattice edges on $\Omega(v^*)$ and one of four lattice neighbors is used to create an edge that separates $\Omega(v^*)$.

9. The method of claim 8, wherein the HSM algorithm further follows Proposition 5: Given every lattice point belonging to $\Omega(v^*)$ is visited at most twice.

10. A method using a Haag Shokoufandeh Marching (HSM) algorithm that returns a watershed boundary, the method comprising:
accepting as input a grid cell $v^*$ and a D8 graph G, wherein the D8 graph G vertices are labeled with discovery time and finish-time, wherein within a structure of the D8 graph G, every grid cell is connected with eight neighboring grid cells associated with a respected grid cell, wherein the HSM algorithm marches around a watershed identifying valid edges and returning to an original starting location, wherein marching the HSM algorithm includes identifying a valid march direction based on a current march location of the HSM algorithm, wherein an abstraction of a flow direction grid G is created based on a pour point of the watershed, wherein the abstraction denotes at least one lattice point of each grid cell of the watershed, wherein a modified nested set (MNS) is applied to the abstraction of the flow direction grid G, wherein a Boundary Point (BNP) function returns a Boolean value for two grid cells in front of the current march location, and wherein based on previous march step and outcome of combinations of the BNP function calls, the march is extended.

11. The method of claim 10, wherein at each step of the march, the HSM algorithm identifies the valid march direction based on a Boolean inclusion condition, and wherein a vertex is deemed as exclusively on the boundary of the watershed when its discovery value is between original pour points discovery and finish value.

12. The method of claim 10, wherein based on the possible combinations of the BNP function calls and assuming the previous march step was towards north, if both BNP are True then the march will move to east, if both are false towards west, if a right hand cell is False and a left hand cell is True then towards north, and finally if the right hand cell is True and the left hand cell is False then the march can either move to west or to east.

* * * * *